US008233171B2

(12) United States Patent
Hagiuda

(10) Patent No.: US 8,233,171 B2
(45) Date of Patent: Jul. 31, 2012

(54) DEVICE MANAGING APPARATUS, METHOD OF CONTROLLING THE SAME, AND CONTROL PROGRAM

(75) Inventor: Tadashi Hagiuda, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1201 days.

(21) Appl. No.: 10/991,299

(22) Filed: Nov. 17, 2004

(65) Prior Publication Data

US 2005/0105132 A1    May 19, 2005

(30) Foreign Application Priority Data

Nov. 17, 2003  (JP) .................................. 2003-386986
Nov. 4, 2004   (JP) .................................. 2004-320618

(51) Int. Cl.
*G06F 15/00* (2006.01)

(52) U.S. Cl. ........................ 358/1.15; 358/1.19; 358/402

(58) Field of Classification Search .................. 358/402, 358/1.1, 1.5, 440, 474; 709/238, 223, 202
See application file for complete search history.

(56) References Cited

U.S. PATENT DOCUMENTS

| 6,782,420    | B1 * | 8/2004  | Barrett et al. ................. | 709/223 |
| 7,450,258    | B2 * | 11/2008 | Reese et al. ................... | 358/1.15 |
| 2002/0143936 | A1 * | 10/2002 | Yu ................................. | 709/224 |
| 2003/0163582 | A1 * | 8/2003  | Inoue et al. ................... | 709/238 |

FOREIGN PATENT DOCUMENTS

| JP | 11-316658   | A  | 11/1999 |
| JP | 2001-175622 | A  | 6/2001  |
| JP | 2002-510415 | A  | 4/2002  |
| JP | 2003-108448 | A  | 4/2003  |
| JP | 2003-231334 | A  | 8/2003  |
| WO | 98/59479    | A1 | 12/1998 |

OTHER PUBLICATIONS

Sawamura, Akira, A wealth of essential techniques on using your PC and peripherals together easily, Communication In., Mar. 29, 2002, vol. 7, No. 8. Cited in OA, mailed Apr. 1, 2008, in corresponding JP 2004-320618.
Aizawa, Kazushi, "Try!PC", Try!PC, vol. II, No. 2, May 1, 1999, p. 22. Cited in Japanese Refusal dated Jan. 6, 2009, with partial English translation.

* cited by examiner

*Primary Examiner* — King Poon
*Assistant Examiner* — Iriana Cruz
(74) *Attorney, Agent, or Firm* — Rossi, Kimms & McDowell LLP

(57) ABSTRACT

A device managing apparatus which can collectively manage a plurality of devices connected to a network and reduce resources such as time and costs required for developing a network device managing program. It is determined whether or not each of the devices connected to the device managing apparatus via the network has a unique device management page of the device for management of the device. If any of the devices does not have a unique device management page thereof, a device management page for the device is created. If any of the devices has a unique device management page thereof, it is then determined whether or not it is possible to communicate with the device. If it is possible to communicate with the device, information indicative of the unique device management page of the device is acquired.

14 Claims, 10 Drawing Sheets

DEVICE MANAGING APPARATUS, METHOD OF CONTROLLING THE SAME, AND CONTROL PROGRAM

BACKGROUND OF THE INVENTION

1. Field of the Invention

The present invention relates to a device managing apparatus, a method of controlling the same, and a control program.

2. Description of the Related Art

In recent years, a variety of peripheral devices such as computers and printers have been generally connected to each other via a local area network so that many users can share the resources of the devices.

To check the operative status of a printer in such a network environment, it is necessary to refer to the operating panel of the printer, but a printer which is shared by many users is not always placed in the vicinity of computers operated by the users. Also, the operating panel of a printer has only a small display area for displaying information, and hence the amount of information which can be displayed is limited. Thus, it is difficult to correctly recognize the operative status of the printer.

For this reason, a network device managing program has been introduced which makes it possible to recognize the operative statuses of devices such as a printer connected to a client via a network. According to the network device managing program, notifications which notify the settings of device operations, the occurrence of a failure in a device, and so forth can be displayed on the display of the client.

Such a network device managing program must be installed in each of a plurality of clients connected to a network, and for example, in the case where the administrator of the network collectively manages the clients, it takes a lot of time to e.g. manage the version. To address this problem, a network device managing program has been introduced which is installed in a WWW server connected to clients and devices via a network (refer to Japanese Laid-Open Patent Publication (Kokai) No. 2003-108448, for example).

According to the network device managing program, the devices can be collectively managed by the WWW server, and the operative statuses of the devices can be checked through the operation of the clients via a browser program. The network device managing program generates an HTML page which displays a list of devices connected to the network (hereinafter referred to as "the device list page") and an HTML page which is linked to the device list page and displays and configures detailed device management information on each device (hereinafter referred to as "the device management page"), and displays the generated HTML pages on the displays of the clients.

On the other hand, a device such as a printer having a unique device management page has also been introduced. Such a device has a WWW server program which enables a unique device management page of the device to be displayed on a client by the user setting reference information comprised of a network address of the device, a preset port number, or an alias in a WWW browser program of the client.

According to the network device managing program, however, even for a device which has a WWW server program and a unique device management page, a device management page corresponding to the functional specification of the device is newly created. Therefore, in the case where a device which is to be managed according to the network device managing program is newly developed, the network device managing program must be provided with a function of creating a device management page corresponding to the newly developed device, and this increases resources such as time and costs required for developing the network device managing program.

Further, the unique device management page of the device is used to manage only the device, and hence it is impossible to collectively manage a plurality of devices connected to a network.

SUMMARY OF THE INVENTION

It is an object of the present invention to provide a device managing apparatus, a method of controlling the same, and a control program which are capable of collectively managing a plurality of devices connected to a network and reducing resources such as time and costs required for developing a network device managing program.

To attain the above object, in a first aspect of the present invention, there is provided a device managing apparatus which manages devices connected to a network, comprising a device management page presence determining device that determines whether each of the devices connected to the device managing apparatus via the network has a unique device management page of the device for management of the device, a creating device operable when the device management page presence determining device determines that any of the devices does not have a unique device management page thereof, to create a device management page for the device, a communication possibility determining device operable when the device management page presence determining device determines that any of the devices has a unique device management page thereof, to determine whether it is possible to communicate with the device, and an acquiring device operable when the communication possibility determining device determines that it is possible to communicate with the device, to acquire information indicative of the unique device management page of the device.

With the arrangement of the first aspect of the present invention, when the device management page presence determining device determines that any of the devices does not have a unique device management page thereof, a device management page for the device is created, and when said device management page presence determining device determines that any of the devices has a unique device management page thereof, information indicative of the unique device management page of the device is acquired, which makes it possible to collectively manage a plurality of devices connected to a network and reduce resources such as time and costs required for developing a network device managing program.

Preferably, the device managing apparatus further comprises a second creating device operable when the communication possibility determining device determines that it is impossible to communicate with the device, to create a device management page different from the device management page created by the creating device and the unique device management page of the device.

Preferably, the device management page includes information indicative of status of the device.

Preferably, the communication possibility determining device determines whether it is possible to communicate with the device according to HTTP protocol.

Preferably, the device managing apparatus further comprises a retrieving device that retrieves devices connected to the device managing apparatus via the network, and a device list page creating device that creates a device list page for displaying a list of the devices retrieved by the retrieving device, on a client apparatus.

More preferably, the device managing apparatus further comprises a reference information embedding device operable when any of the retrieved devices has a unique device management page thereof, to embed reference information for referring to the unique device management page of the device in the device list page.

To attain the above object, in a second aspect of the present invention, there is provided a method of controlling a device managing apparatus which manages devices connected to a network, comprising a device management page presence determining step of determining whether each of the devices connected to the device managing apparatus via the network has a unique device management page of the device for management of the device, a creating step of creating a device management page for any of the devices when it is determined in the device management page presence determining step that the device does not have a unique device management page thereof, a communication possibility determining step of determining whether it is possible to communicate with any of the devices when it is determined in the device management page presence determining step that the device has a unique device management page thereof and an acquiring step of acquiring information indicative of the unique device management page of the device when it is determined in the communication possibility determining step that it is possible to communicate with the device.

Preferably, the method of controlling a device managing apparatus further comprising a second creating step of creating a device management page different from the device management page created in the creating step and the unique device management page of the device, when it is determined in the communication possibility determining step that it is impossible to communicate with the device.

Preferably, the method of controlling a device managing apparatus further comprising a retrieving step of retrieving devices connected to the device managing apparatus via the network, and a device list page creating step of creating a device list page for displaying a list of the devices, retrieved in the retrieving step, on a client apparatus.

More preferably, the method of creating a device managing apparatus further comprising a reference information embedding step of embedding reference information for reference to the unique device management page of any of the retrieved devices in the device list page when the device has a unique device management page thereof.

To attain the above object, in a third aspect of the present invention, there is provided a control program for causing a computer to execute a method of controlling a device managing apparatus which manages devices connected to a network, comprising a device management page presence determining module for determining whether each of the devices connected to the device managing apparatus via the network has a unique device management page of the device for management of the device, a creating module for creating a device management page for any of the devices when it is determined in the device management page presence determining module that the device does not have a unique device management page thereof, communication possibility determining module for determining whether it is possible to communicate with any of the devices when it is determined in the device management page presence determining module that the device has a unique device management page thereof, and an acquiring module for acquiring information indicative of the unique device management page of the device when it is determined in the communication possibility determining module that it is possible to communicate with the device.

Preferably, the control program further comprising a second creating module for creating a device management page different from the device management page created in the creating module and the unique device management page of the device, when it is determined in the communication possibility determining module that it is impossible to communicate with the device.

Preferably, the control program further comprising a retrieving module for retrieving devices connected to the device managing apparatus via the network, and a device list page creating module for creating a device list page for displaying a list of the devices, retrieved in the retrieving module, on a client apparatus.

More preferably, the control program according to claim 13, further comprising a reference information embedding module for embedding reference information for reference to the unique device management page of any of the retrieved devices in the device list page when the device has a unique device management page thereof.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
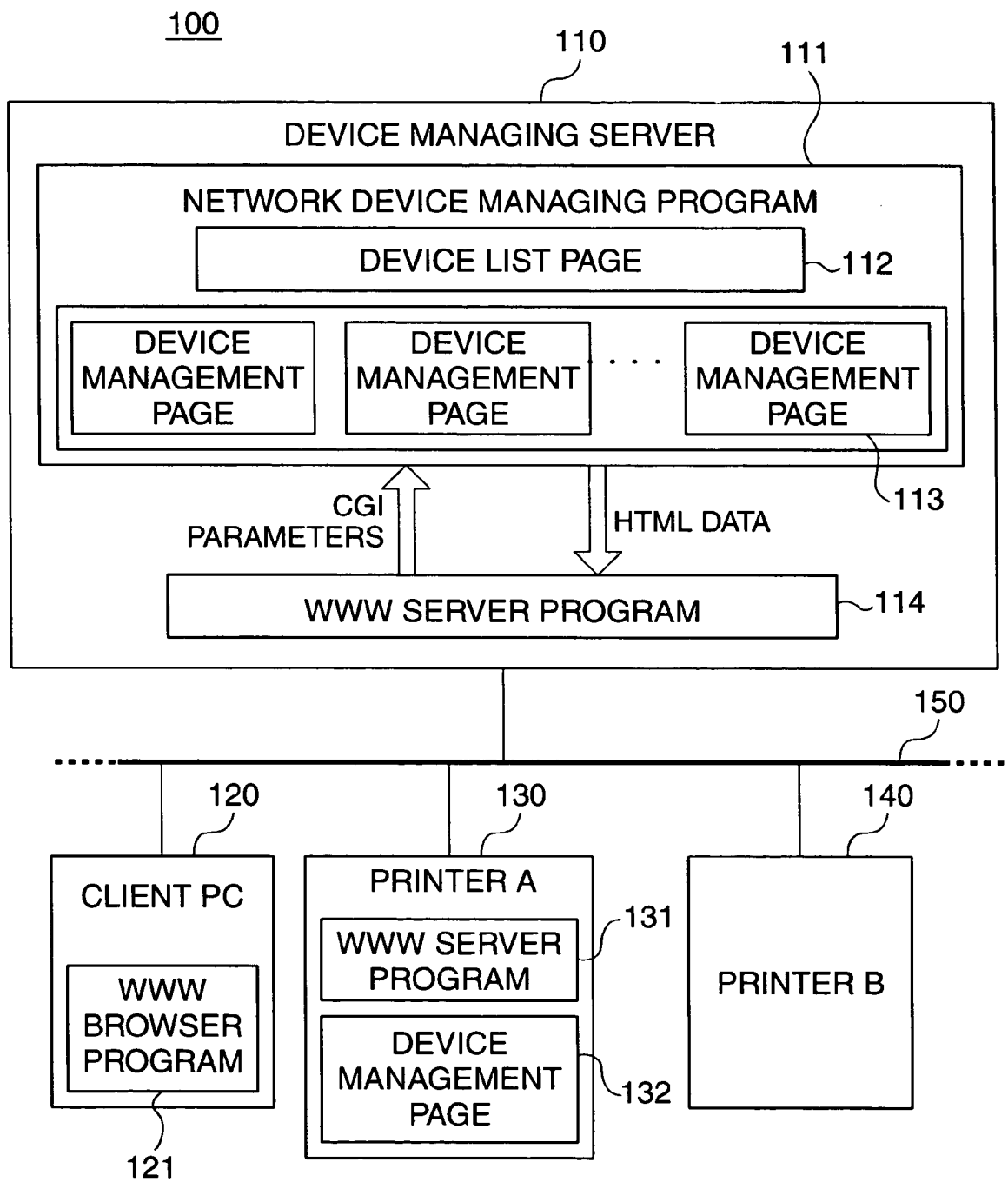
FIG. 1 is a block diagram showing the arrangement of a network device managing system including a device managing apparatus according to an embodiment of the present invention.

FIG. 1 is a block diagram showing the arrangement of a network device managing system including a device managing apparatus according to an embodiment of the present invention.

As shown in FIG. 1, a network device managing system 100 according to the embodiment is comprised of a client PC 120 (client) having a WWW browser program 121, a printer 130 (device) having a WWW server program 131 which is used to supply device management information on the printer 130 to the client PC 120, and a device management page 132 as HTML data for device management, a printer 140 (device) which does not have either of the WWW server program 131 and the device management page 132, and a device managing server 110 (device managing apparatus) which manages devices such as the printers 130 and 140. These component parts are connected to each other via a local area network (LAN) 150.

Although in FIG. 1, the network device managing system 100 is illustrated as including one client PC and two printers, this is not limitative, but it suffices that the network device managing system 100 includes at least one client PC and at least one device such as a printer.

The device managing server 110 has a network device managing program 111 which manages devices such as the printers 130 and 140, and a WWW server program 114 which is used to process requirements issued from the client PC 120 according to HTTP (Hypertext Transfer Protocol) protocol. The network device managing program 111 is activated by CGI (Common Gateway Interface) through the operation of the client PC 120 via the WWW server program 114, and receives CGI parameters from the WWW server program 114 and sends HTML data to the client PC 120 via the WWW server program 114.

Figure 2:
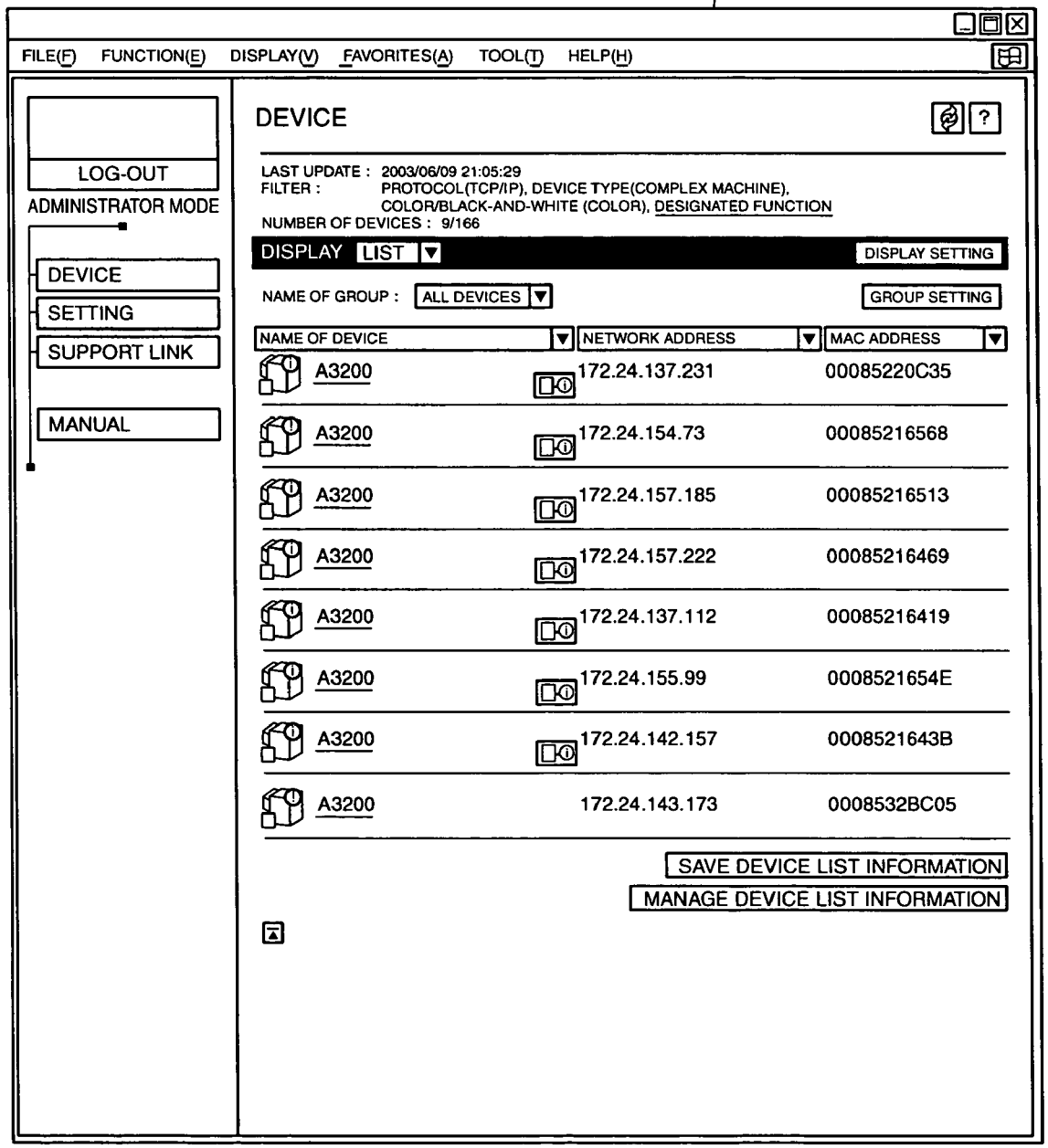
FIG. 2 is a view showing an example of a device list page in FIG. 1.

The network device managing program 111 retrieves devices such as the printers 130 and 140 connected to the network according to SNMP (Simple Network Management Protocol) or a unique procedure, and creates HTML data of the device list page 112 in FIG. 2 so as to display a list of the names of the retrieved devices and sends the HTML data to the client PC 120.

As shown in FIG. 2, a list of the names of devices connected to the LAN 150 is displayed on the device list page 112, and the user selects his/her desired device from the device list page 112 to request the display of a device management page for the selected device.

Figure 3:
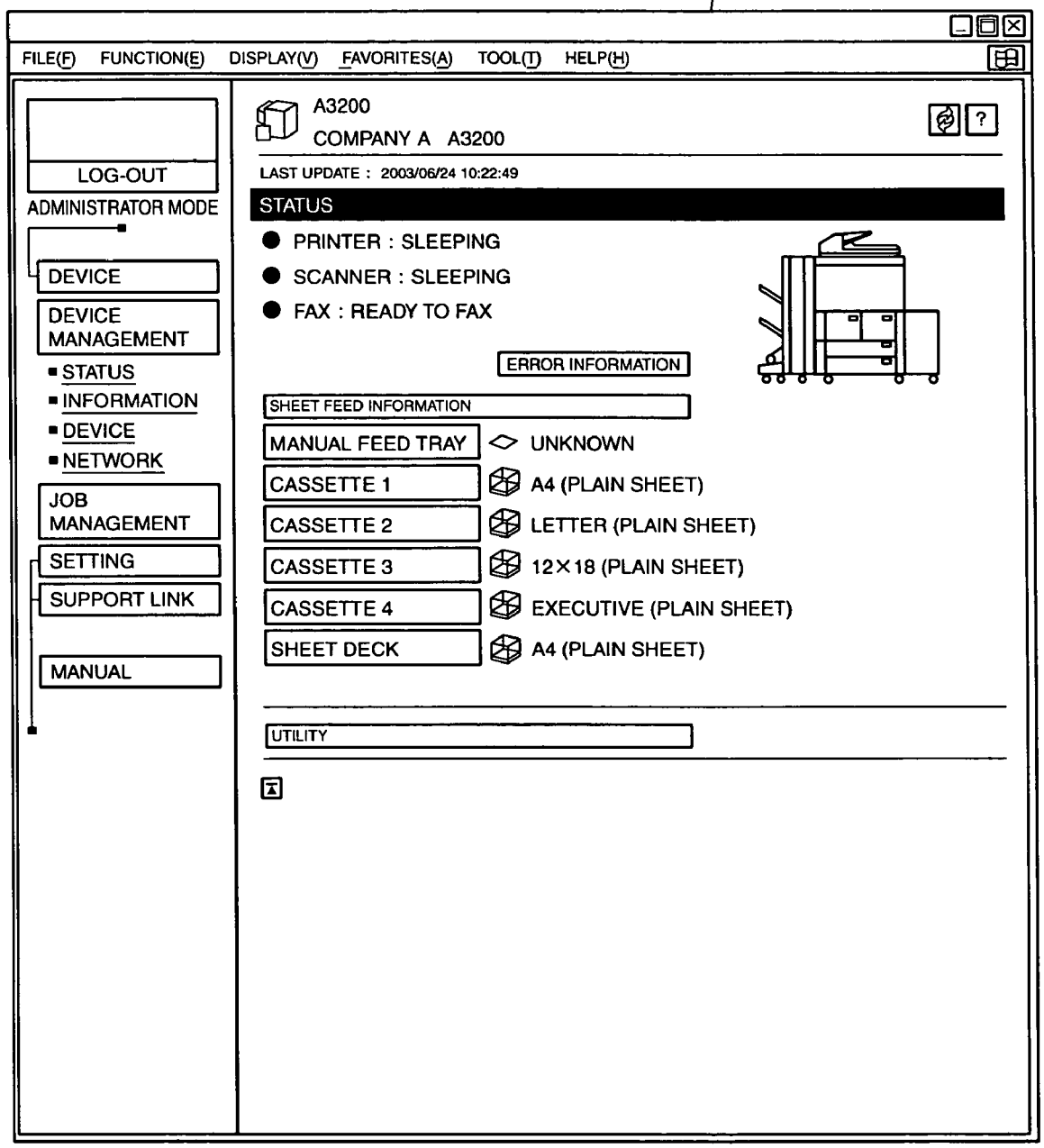
FIG. 3 is a view showing an example of a device management page in FIG. 1.

When the display of a device management page for the printer 140 which does not have either of the WWW server program 131 and the unique device management page 132 is requested, the network device managing program 111 acquires device management information on the printer 140 from the printer 140, creates HTML data on the device management page 113 in FIG. 3 based on the acquired device management information, and sends the created HTML data to the client PC 120 via the WWW server program 114.

As shown in FIG. 3, the names of devices, the statuses of the devices, and device management information such as sheet feed information are displayed on the device management page 113, on which the user can check and configure the device management information.

On the other hand, if the display of a device management page for the printer 130 which has the WWW server program 131 and the unique device management page 132 is requested, the printer 130 acquires device management information on the printer 130 via an internal interface thereof, generates HTML data on the device management page 132 based on the acquired device management information, and sends the created HTML data to the client PC 120 via the WWW server program 131.

According to the above arrangement, the user selects his/her desired device from the device list page 112 displayed on the display of the client PC 120 to display a device management page on the display of the client PC 120, so that he/she can check detailed device management information.

Figure 4:
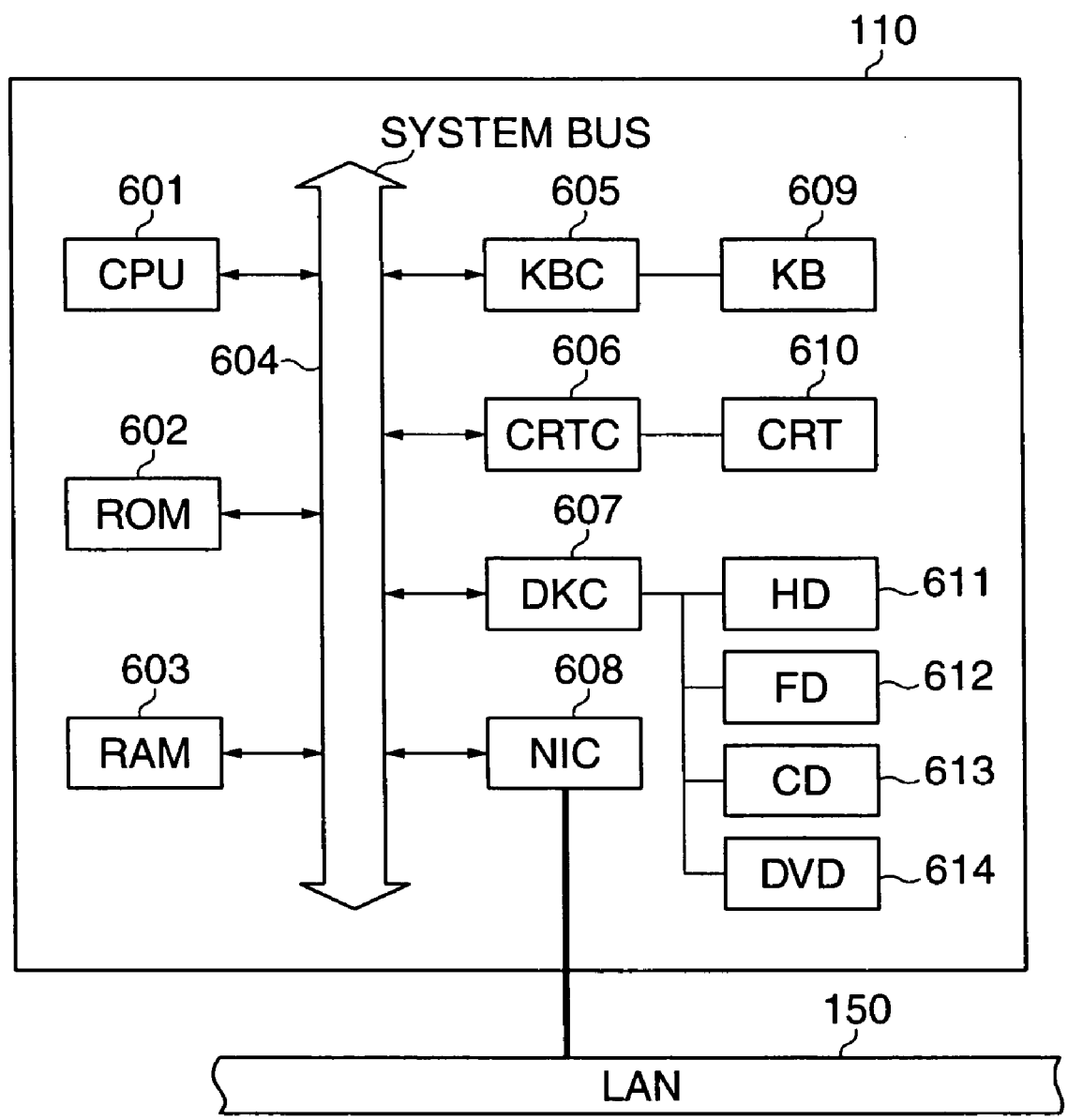
FIG. 4 is a block diagram showing the internal construction of the device managing apparatus in FIG. 1.

FIG. 4 is a block diagram showing the internal construction of the device managing server 110.

A CPU 601 executes a network device managing program, which is supplied from a storage medium readable from a floppy disk drive (FD) 612, a compact disk drive (CD) 613, a digital video disk drive (DVD) 614, or the like or from an external server PC via a network interface card (NIC) and a local area network (LAN) 150, or is stored in a ROM 602, a hard disk (HD) 611, or the like as a storage device installed in advance in the device managing server 110, to collectively control a variety of devices connected to a system bus 604.

Reference numeral 603 denotes a RAM which functions as a main memory, a working area, and so forth for the CPU 601. Reference numeral 605 denotes a keyboard controller (KBC) which controls command inputs from a keyboard (KB) 609, a pointing device, not shown, and so forth. Reference numeral 606 denotes a CRT controller (CRTC) which controls the display of a CRT display (CRT) 610.

Reference numeral 607 denotes a disk controller (DKC) which controls access to the hard disk (HD) 611, floppy disk drive (FD) 612, compact disk drive (CD) 613, and digital video disk drive (DVD) 614, which store a boot program, a variety of applications, editing files, user files, a network device control program, and so forth.

Reference numeral 608 denotes a network interface card (NIC) which exchanges data with a client PC or a network device, which is to be managed in accordance with the network managing program 111, via the LAN 150.

In the device managing server 110 constructed as described above, the network device managing program 111 is stored in the hard disk (HD) 611. In the following description, the CPU 601 is main hardware that performs processing if not otherwise specified. On the other hand, the network device managing program 111 stored in the hard disk (HD) 611 is main software that provides control.

In the present embodiment, it is assumed that Windows 2000 (produced by Microsoft Corporation) is used as an OS, but this is not limitative.

Also, the control program according to the present embodiment may be supplied by storing in a storage medium such as a floppy disk or a CD-ROM, and in this case, the program is read from the storage medium by the floppy disk drive (FD) 612, the compact disk drive 613, the digital disk drive 614, or the like in FIG. 4 and is installed in the hard disk (HD) 611.

Figure 5:
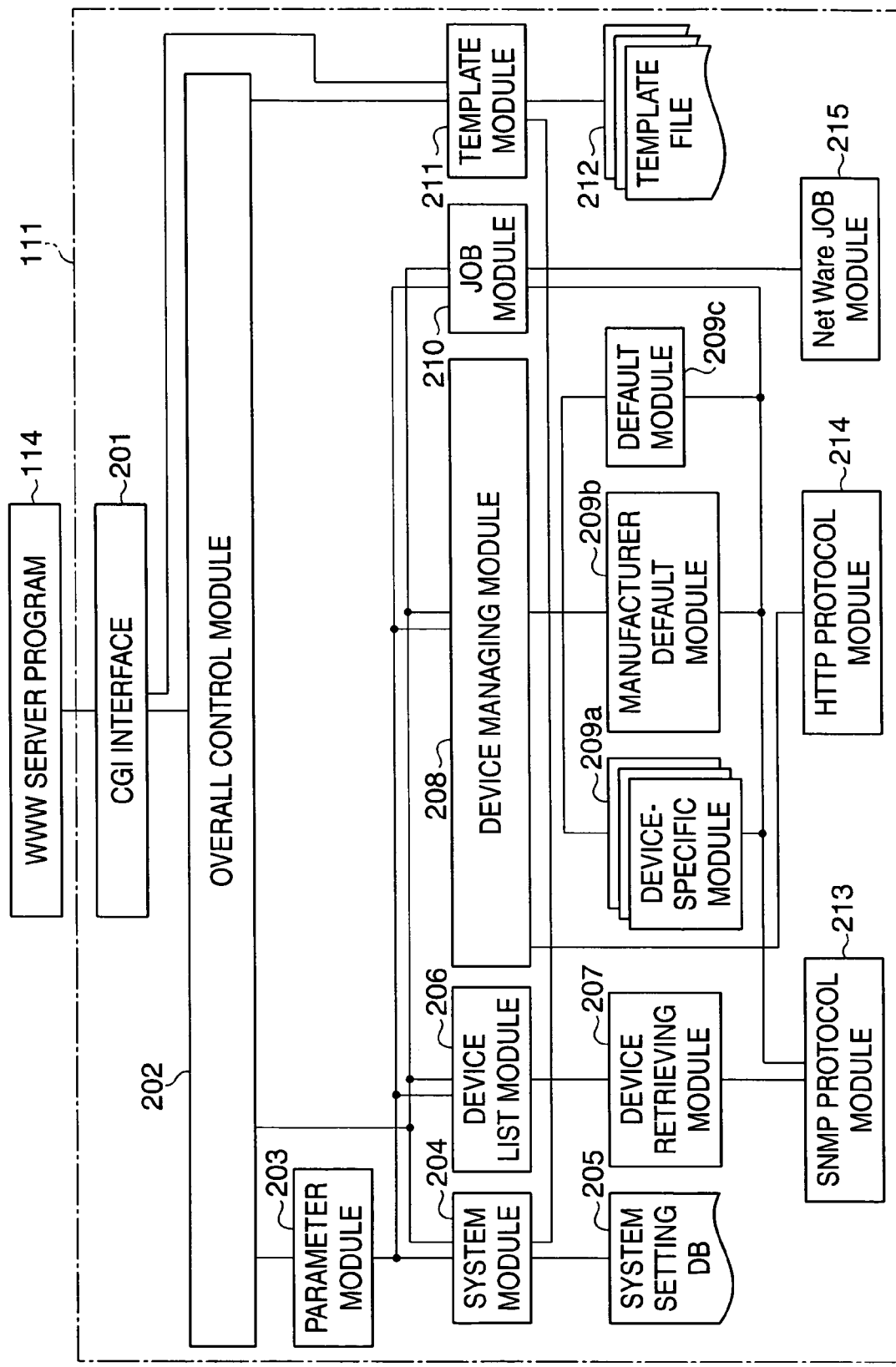
FIG. 5 is a block diagram showing the module configuration of a network device managing program appearing in FIG. 1.

FIG. 5 is a block diagram showing the module configuration of the network device managing program 111 in FIG. 1.

As shown in FIG. 5, the network device managing program 111 is comprised of a CGI interface 201 which receives CGI parameters from the WWW server program 114 and sends HTML data via the WWW server program 114; an overall control module 202 which stores the CGI parameters received from the WWW server program 114 in a parameter module 203, described later, and divides control between modules constituting the network device managing program 111 according to command parameters included in the CGI parameters; the parameter module 203 which stores and manages the CGI parameters in the form of tables under the control of the overall control module 202; a system module 204 which acquires command parameters from the parameter module 203, controls the display and setting of system parameters (such as the expiration date of device management information) specifying the operation of the network device managing program 111, and controls a device list module 206, a device managing module 208, or a job module 210; a system setting database (DB) 205 which stores the system parameters set by the system module 204; a template file 212 which stores templates of HTML documents; and a template module 211 which generates HTML documents based on templates selected from the template file 212 and sends the generated HTML documents to the WWW server program 114 via the CGI interface 201.

The network device managing program 111 is further comprised of an SNMP protocol module 213 which manages MIBs (device management information databases) of devices and carries out control according to SNMP protocol for e.g. sending and receiving SNMP packets to and from devices; an HTTP protocol module 214 which sends an HTTP request to a device and detects the HTTP protocol communication status of the device when it is determined by a device retrieving module 207 that the device has a unique device management page; the device retrieving module 207 which retrieves devices connected to the LAN 150 via the SNMP protocol module 213, and acquires device information such as whether each of the retrieved devices has a unique device management page; and a device list module 206 which generates HTML data of the device list page 112 on which a list of the devices retrieved by the device retrieving module 207 is displayed.

It should be noted that, when creating the device list page 112, the device retrieving module 207 determines whether or not the retrieved devices have their unique device management pages which can be referred to. If the retrieved devices have their unique device management pages which can be referred to, URLs for referring to the unique device management pages which can be referred to are embedded as reference information in the device list page 112. On the other hand, the retrieved devices do not have their unique device management pages which can be referred to, URLs for notifying the network device managing program 111 of a request for displaying device management pages are embedded in the device list page 112.

The network device managing program 111 is further comprised of a device-specific module 209a, a manufacturer default module 209b, and a default module 209c, which acquire device management information from devices via the SNMP protocol module 213 or sets device management information to the devices; a device managing module 208 which generates HTML data of the device management page 113 from information acquired by the device-specific module 209a, the manufacturer default module 209b, or the default module 209c, and determines whether or not the device management page 132 of the devices can be referred to via the HTTP protocol module 214; a Net Ware job module 215 which acquires information indicative of a print job status such as print history, print suspension, and job deletion, using Net Ware API; and a job module 210 which generates HTML data of a job list page for providing job-related control according to information indicative of the print job status, which has been acquired by the SNMP protocol module 213 or the Net Ware job module 215.

The device-specific module 209a is provided for each type of devices to which the network device management program 111 conforms, and acquires device management information from each device in accordance with a request from the device list module 206, and sets device management information by converting a set value notified by CGI parameters to a value which can be interpreted by the device and sending the value to the device.

The manufacturer default module 209b acquires information from devices of manufacturers to which the network device management program 111 conforms, and sets device information. The manufacturer default module 209b operates basically in the same manner as the device-specific module 209a, but handles information which is common to devices of all the manufactures and does not include equipment information (information on attachment of options) which depends on device models.

The default module 209c acquires device management information from devices of manufacturers to which the network device management program 111 does not conform, and sets device management information. The default module 209c handles ordinary device management information which does not depend on device models and manufacturers.

Upon acquisition of a command parameter indicative of a request for the display of system parameters from the parameter module 203, the system module 204 reads out system parameters stored in the system setting database 205 and generates HTML data for displaying the system parameters via the template module 211. On the other hand, upon acquisition of a command parameter indicative of a request for the setting of system parameters from the parameter module 203, the system module 204 writes the system parameters in the system setting database 205.

Further, upon acquisition of a command parameter indicative of a request for the display of a device list, a device management page, or a job list page, the system module 204 controls the device list module 206, the device managing module 208, or the job module 210, and causes the template module 211 to select a necessary template to generate HTML data.

Figure 6:
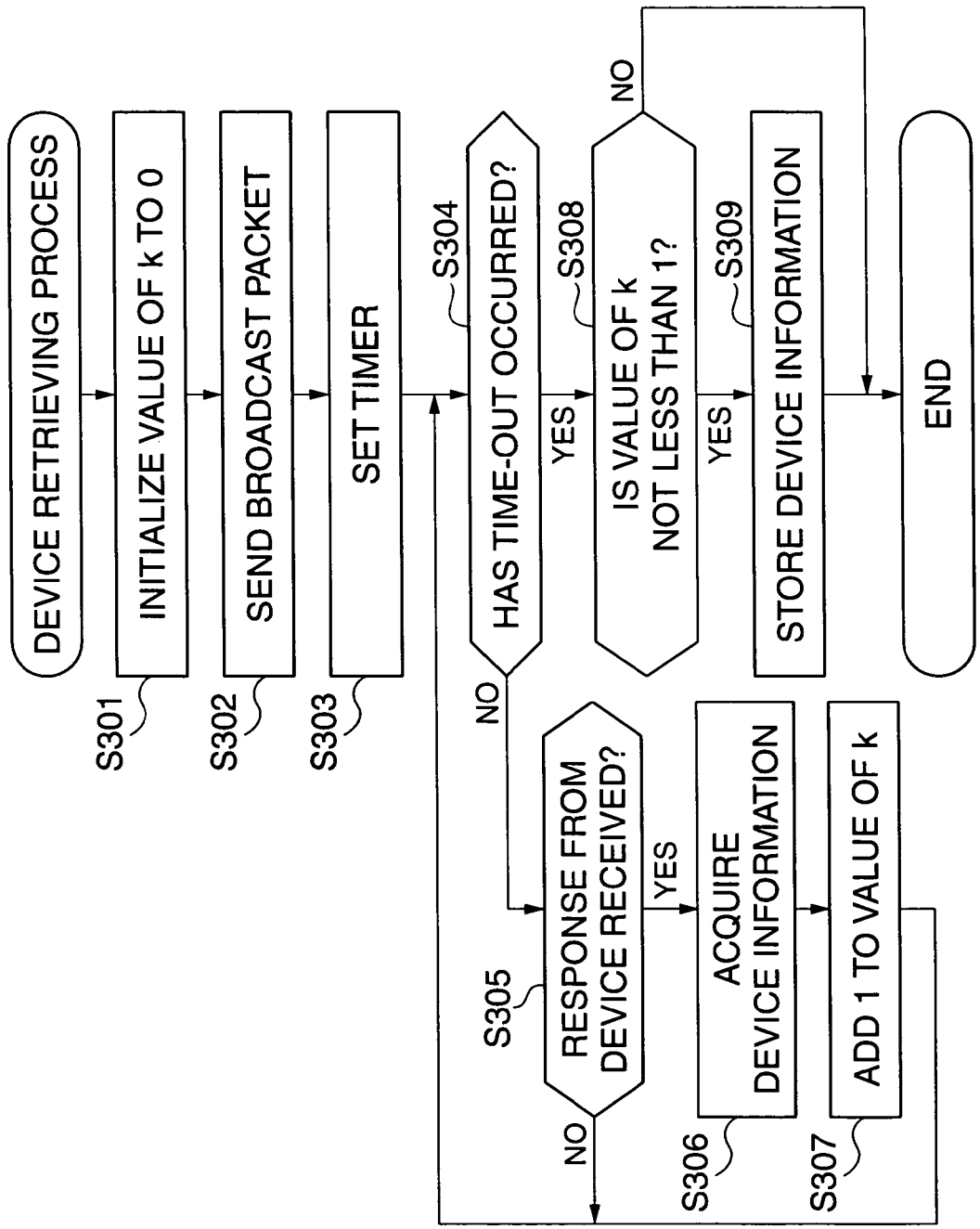
FIG. 6 is a flow chart showing a device retrieving process carried out in accordance with the network device managing program in FIG. 5.

FIG. 6 is a flow chart showing a device retrieving process carried out in accordance with the network device managing program 111 in FIG. 5.

In the flow chart of FIG. 6, devices connected to the LAN 150 are retrieved by sending a broadcast packet to devices connected to the LAN 150 according to the SNMP protocol and receiving responses from the devices which have received the broadcast packet.

As shown in FIG. 6, a variable k for counting the number of retrieved devices is initialized to 0 (step S301), a broadcast packet for retrieving devices connected to the network is sent to devices (such as the printers 130 and 140) connected to the LAN 150 (step S302), a predetermined value is set to a timer for monitoring responses from the devices to which the broadcast packet has been sent (step S303), and it is determined whether or not the timer has timed out (step S304).

If it is determined in the step S304 that the timer has not timed out, it is determined whether or not responses have been received from the devices (step S305). If the responses have been received, device information (for example, manufacturer identification information and the presence of the unique device management page 132) is acquired from the devices which have sent the received responses (step S306). Then, 1 is added to the variable k for counting the number of retrieved devices (step S307), and the process returns to the step S304.

If it is determined in the step S304 that the timer has timed out, the receipt of the responses from the devices is terminated to determine whether or not the variable k is equal to or greater than 1 (step S308). If the variable k is equal to or greater than 1, i.e. if at least one device has been retrieved, the number of the retrieved devices k and the acquired device information are stored in the storage device of the device managing server 110 (step S309). If the variable k is 0, the process is terminated without storing device information in the step (S309).

It should be noted that in FIG. 6, devices connected to the LAN 150 are retrieved using a broadcast packet, but may be retrieved by specifying device IP addresses and inquiring at the MIBs of devices so that only agents of devices having the specified addresses respond to the inquiry.

According to the process in FIG. 6, a broadcast packet is sent to devices connected to the network (step S302), and if responses have been received from the devices ("YES" to the step S305), device information is acquired from the devices which have sent the received responses (step S306). Therefore, a plurality of devices connected to the network can be collectively managed by retrieving the devices connected to the network.

Figure 7:
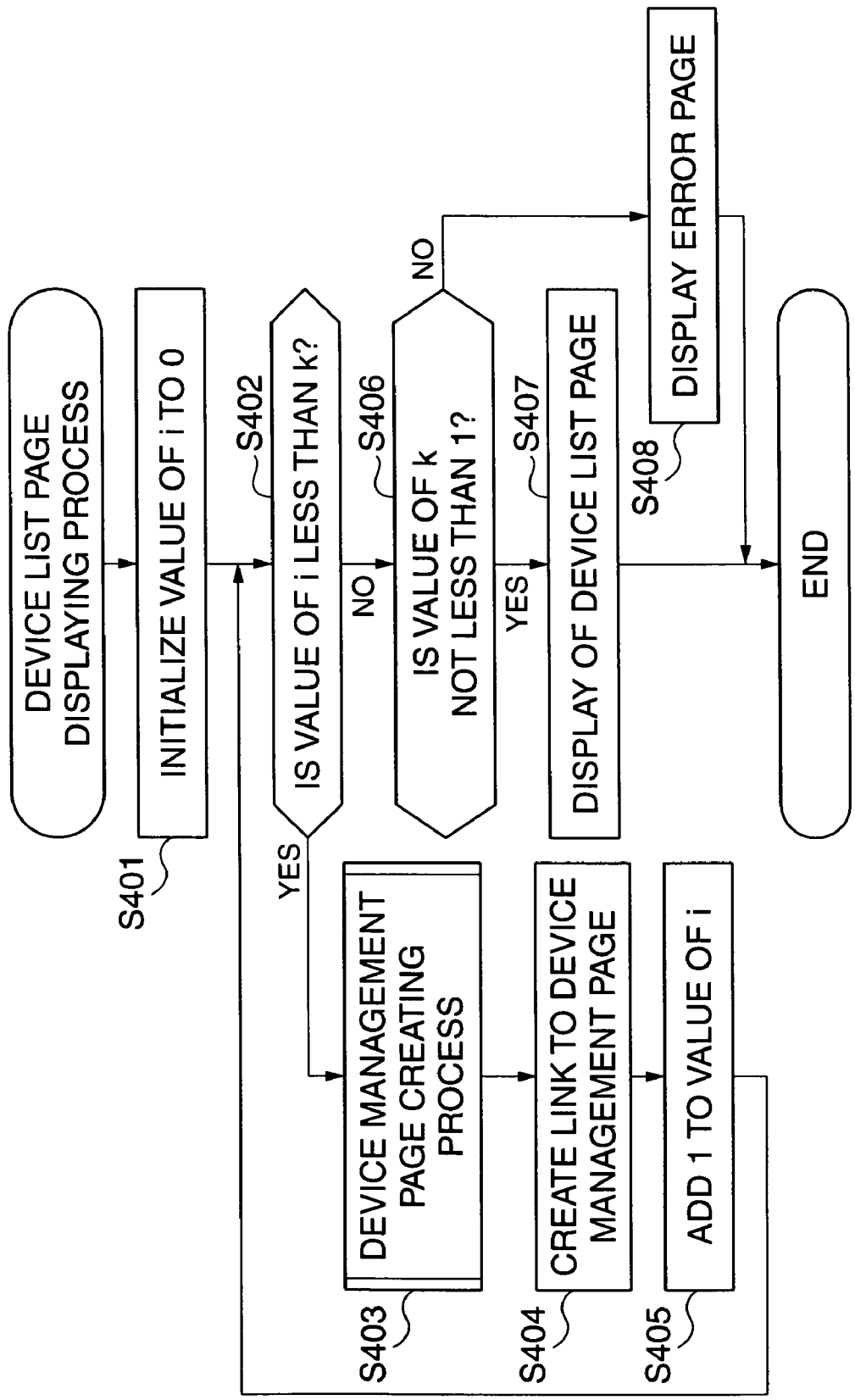
FIG. 7 is a flow chart showing a device list page displaying process carried out in accordance with the network device managing program in FIG. 5.

FIG. 7 is a flow chart showing a device list page displaying process carried out in accordance with the network device managing program 111 in FIG. 5.

It should be noted that in FIG. 7, k devices to be managed are retrieved in advance by the device retrieving process in FIG. 6 to store device information indicative of product names, network addresses, the presence of the device management page 113, and so forth.

As shown in FIG. 7, an index variable i for counting the number of pieces of readout device information is initialized to 0 (step S401), and it is determined whether or not the index variable i is less than the variable k indicative of the number of pieces of device information stored in the storage device of the device managing server 110 (step S402). If the variable i is less than the variable k, i.e. if all the pieces of stored device information has not been read out, a device management page creating process in FIG. 8, described later, is executed, wherein the i-th piece of device information is read out from the device information to create HTML data of a device management page (step S403). Then, a URL as an example of reference information on the created device management page is embedded in the device list page 112 which is being created, to create a link to the device management page on the device list page 112 which is being created (step S404). Then, 1 is added to the index variable i (step S405), and the process returns to the step S402.

If it is determined in the step S402 that the index variable i is not less than the number of pieces of device information k, which is stored in the storage device in the device managing server 110, i.e. if all the pieces of stored device information have been read out, it is then determined whether or not the variable k indicative of the number of pieces of stored device information is equal to or greater than 1 (step S406). If the variable k is equal to or greater than k, i.e. if one or more pieces of device information is stored, HTML data on the created device list page 112 is sent to the browser program of the client PC 120 to display the device list page 112 on the display of the client PC 120 (step S407), and the process is terminated.

On the other hand, if the variable k is 0 (not equal to or greater than 1), i.e. if no piece of device information is stored ("NO" to the step S406), HTML data of an error page which notifies that no device connected to the LAN 150 has not been retrieved, and is sent to the browser program of the client PC 120 via the WWW server program 114 to display the error page on the display of the client PC 120 (step S408), and the process is terminated.

According to the process in FIG. 7, device information is read out to create a device management page (step S403), and the URL of the created device management page is embedded in the device list page 112 to create a link to the device management page in the device list page 112 (step S404). Therefore, it is possible to collectively manage a plurality of devices connected to the network and reduce resources such as time and costs required for developing the network device managing program.

Figure 8:
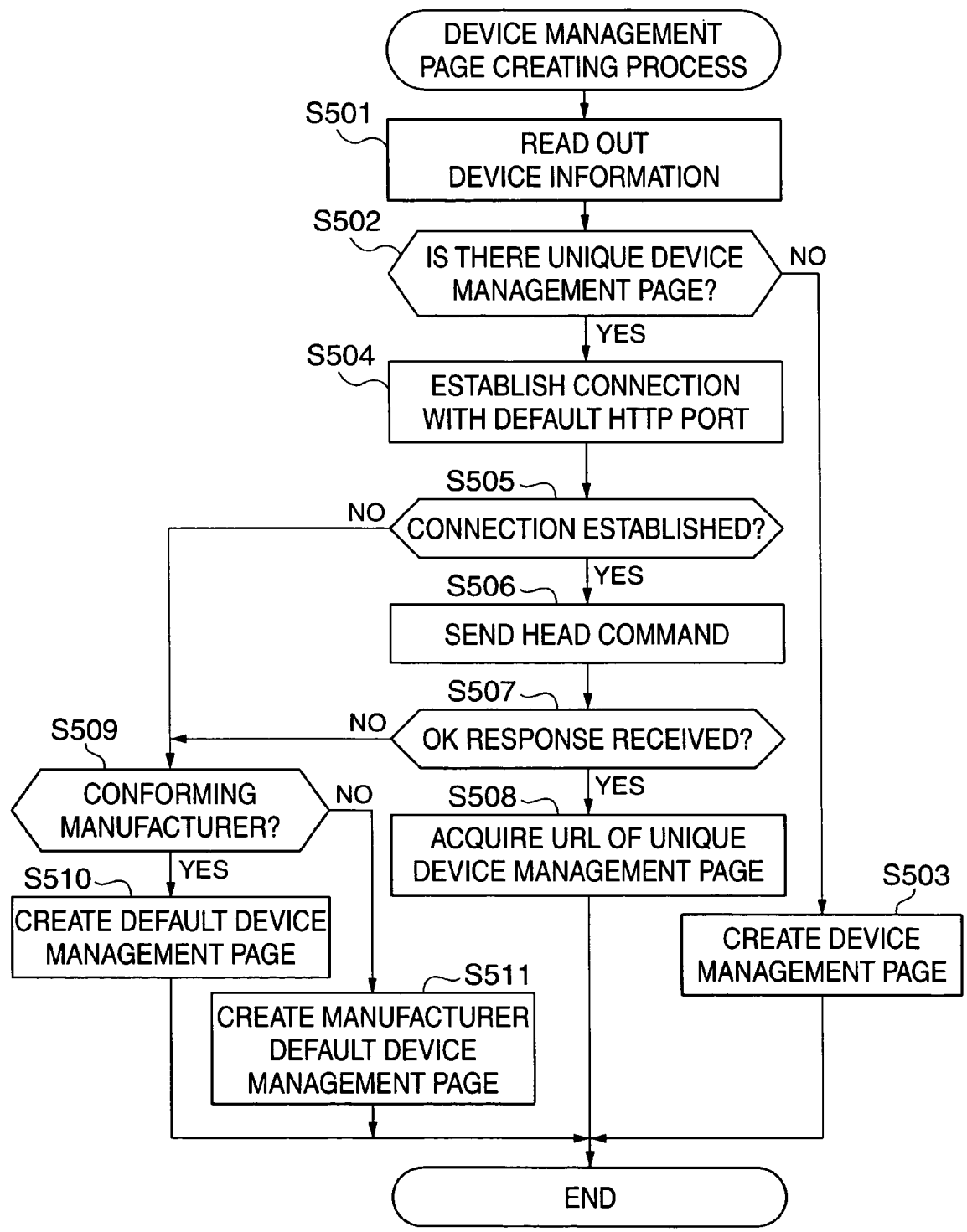
FIG. 8 is a flow chart showing a device management page creating process carried out in a step S403 in FIG. 7.

FIG. 8 is a flow chart showing a device management page creating process carried out in the step S403 in FIG. 7.

As shown in FIG. 8, device information stored in the storage device of the device managing server 110 is read out (step S501), and whether or not the device has its unique device management page 132 is determined according to the readout device information (step S502). If the device does not have its unique device management page 132, HTML data of a device management page is created by the device managing module 208 and the device-specific module 209a (step S503). The process is then terminated.

If it is determined in the step S502 that the device has its unique device management page 132, the HTTP protocol module 213 establishes connection with a port of the device for communication according to the HTTP protocol (hereinafter referred to as "the HTTP port") (step S504), and it is determined whether or not connection with the HTTP port has been established (step S505). If connection with the HTTP port has been established, a HEAD command is sent to the device according to the HTTP protocol (step S506), and it is determined whether or not an OK response has been received from the device in response to the sent HEAD command (step S507). If the OK response has been received from the device, the network device managing program 111 can communicate with the device according to the HTTP protocol, and hence a URL of the unique device management page 132 of the device is acquired (step S508). The process is then terminated.

If it is determined in the step S505 that connection with the HTTP port of the device has not been established, or if it is determined in the step S507 that no OK response has been received from the device, the network device managing program 111 cannot communicate with the device according to the HTTP protocol, and hence it is determined whether or not the network device managing program 111 conforms to the manufacturer of the device (step S509). If the network device managing program 111 conforms to the manufacturer of the device, HTML data of a manufacturer default device management page is created by the device managing module 208 and the manufacturer default module 209b (step S510), and the process is terminated.

If it is determined in the step S509 that the network device managing program 111 does not conform to the manufacturer of the device, HTML data of a default device management page is created by the device managing module 208 and the default module 209c (step S511), and the process is terminated.

Figure 9:
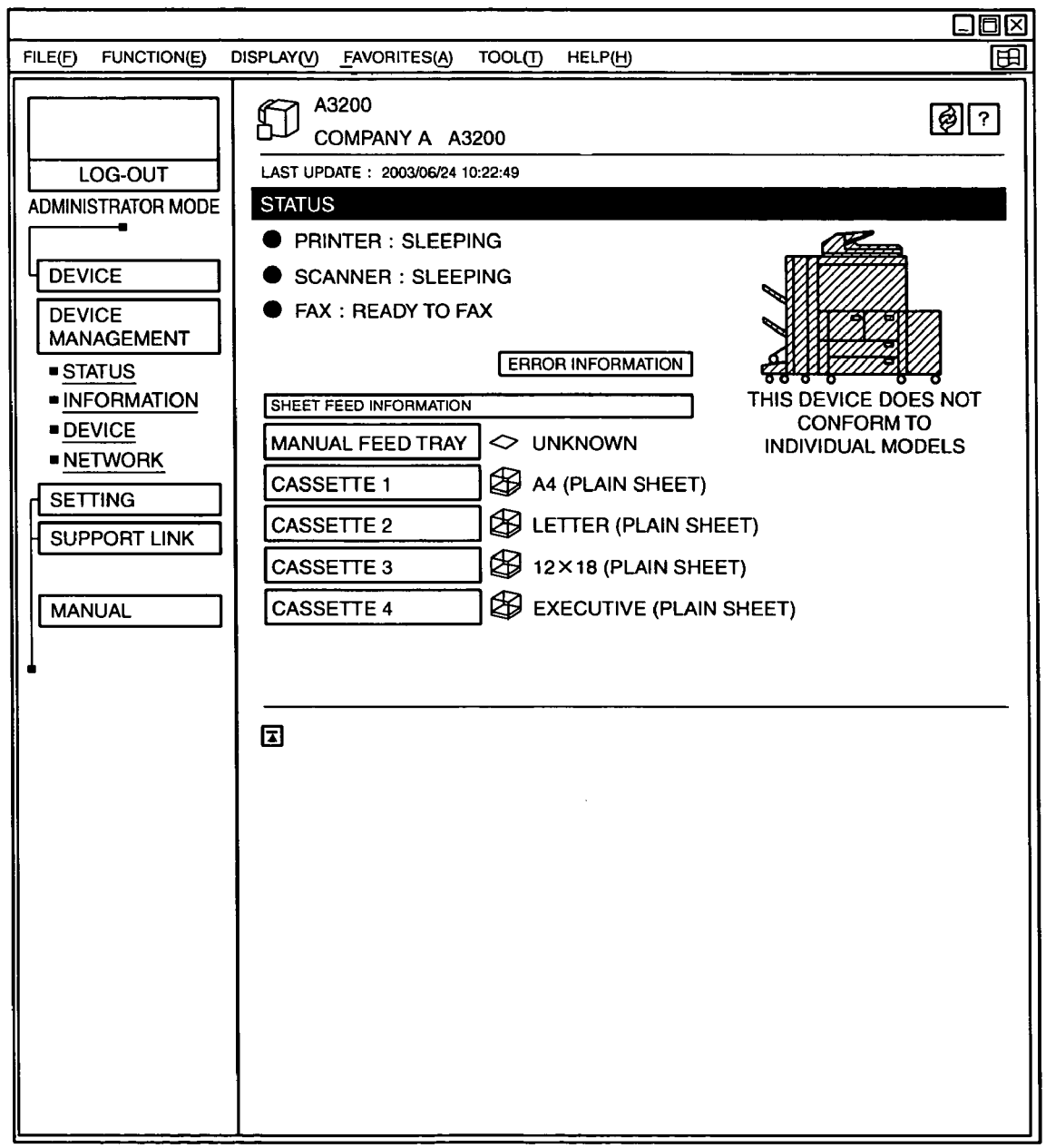
FIG. 9 is a view showing an example of a device management page of a manufacturer's default, which is generated by a device management module 208 and a manufacturer's default module 209*b* in FIG. 5.

It should be noted that as shown in FIG. 9, on the manufacturer default device management page created in the step S510, detailed information corresponding to the specification of the model of a device cannot be displayed and set, but only information common to devices produced by the manufacturer can be displayed and set. Therefore, for example, the appearance image of a device that is displayed does not correspond to the model, but corresponds to the properties of a multi-function apparatus, a laser beam printer, or the like. Further, the attachment status of options such as a cassette deck and a sorter is not reflected on the displayed information, and also, information relating to a job cannot be displayed.

Figure 10:
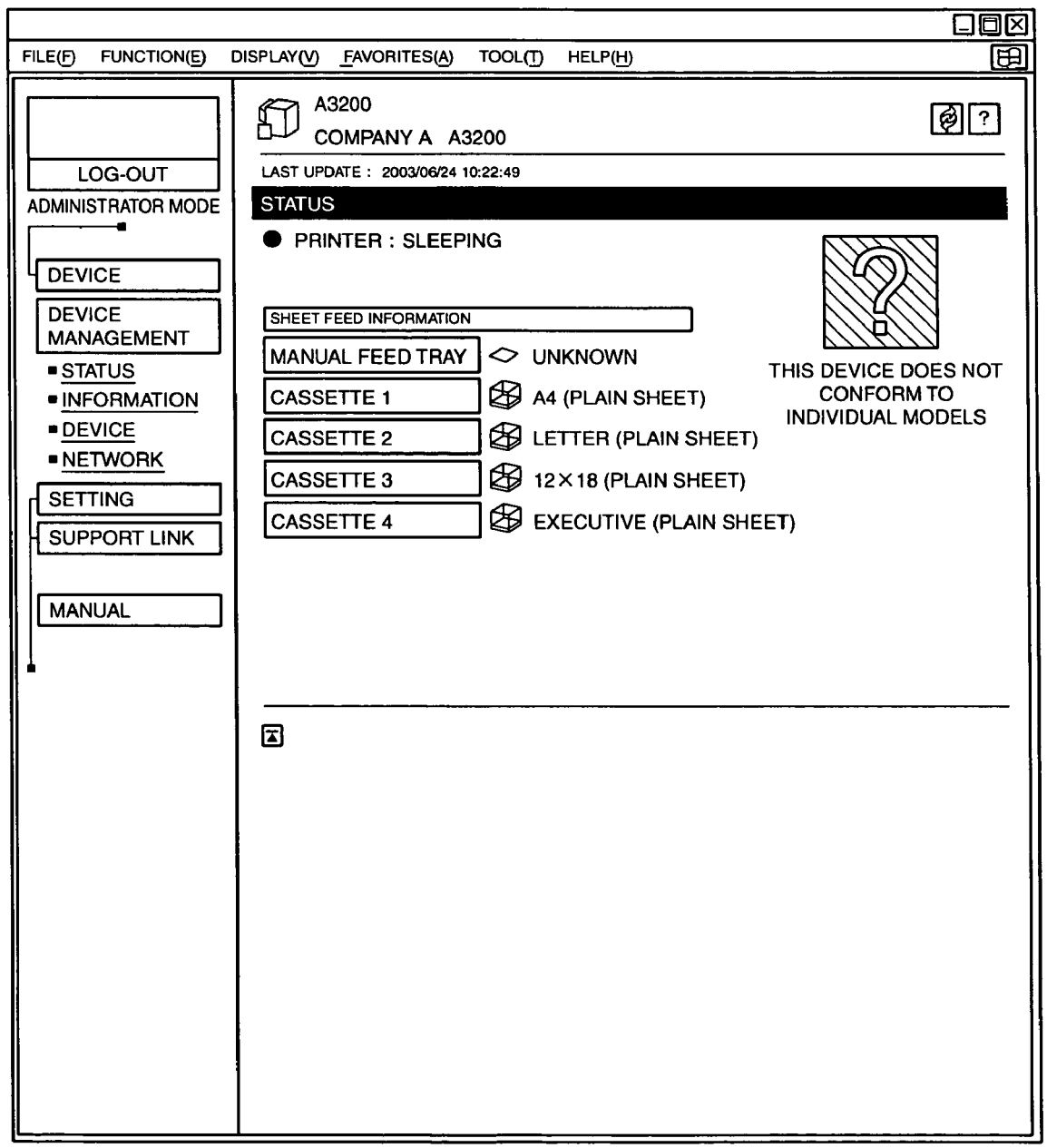
FIG. 10 is a view showing an example of a device management page of a manufacturer's default, which is generated by the device management module 208 and the manufacturer's default module 209*b* in FIG. 5.

Further, as shown in FIG. 10, on the default device management page created in the step S511, only information owned by a more common device as compared with the manufacturer default device management page can be displayed and set. Therefore, for example, the appearance image of a device cannot be displayed, and even if the concerned device is a multi-function apparatus with a facsimile function and a copying function, only information relating to the status of a printer is displayed.

According to the process in FIG. 8, when a device has its unique device management page 132 ("YES" to the step S502), a URL of the device's unique device management page 132 is acquired (step S508). Therefore, it is possible to prevent the new creation of a device management page, to thereby enable collective management of a plurality of devices connected to the network, and reduce resources such as time and costs required for developing the network device managing program.

Further, if a device does not have its unique device management page 132 ("NO" to the step S502), HTML data of a device management page is created by the device managing module 208 and the device-specific-module 209a (step S503). Therefore, detailed device information on a device which does not have a device management page can be displayed and set.

Further, in the case where the network device managing program 111 conforms to the manufacturer of a device (step S509) if connection with the HTTP port of the device has not been established ("NO" to the step S505) or if no OK response has been received ("NO" to the step S507), HTML data of a default device management page comprised of information common to devices of the manufacturer is created by the device managing module 208 and the manufacture default module 209b (step S511), and therefore, it is possible to display and set management information common to devices of the manufacturer which do not have their unique device management pages 132.

If the network device managing program 111 does not conform to the manufacturer of a device, HTML data of a default device management page is created by the device managing module 208 and the default module 209c (step S509), and therefore, it is possible to display and set minimum management information owned by the device.

Although in the present embodiment, when the device list page 112 is created, it is determined whether or not it is possible to communicate with a device having its unique device management page 132 according to the HTTP protocol, and the URL of the device management pages is embedded in the device list page 112, this is not limitative, but it may be configured such that, when a device management page is referred to, the network device managing program is activated to determine whether or not it is possible to communicate with a device having its unique device managing page 132 according to the HTTP protocol, and if it is possible to communicate with the device according to the HTTP protocol, the device management page of the device is displayed.

According to the present embodiment, a device list page is created so as to display a list of retrieved devices on a client, and if one or more of the retrieved devices have its/their unique device management page/pages, reference information for referring to the unique device management page/pages is embedded in the device list page. Therefore, it is possible to collectively manage a plurality of devices connected to a network and reduce resources such as time and costs required for developing the network device managing program.

Further, it is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above-mentioned embodiment on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

CROSS REFERENCE TO RELATED APPLICATION

This application claims priority from Japanese Patent Applications Nos. 2003-386986 filed Nov. 17, 2003, and 2004-320618 filed Nov. 4, 2004 which are hereby incorporated by reference herein.

What is claimed is:

1. A device managing apparatus which manages devices connected thereto via a network, the device managing apparatus comprising:
   a device management page presence determining unit configured to determine whether each of the devices has a unique device management page therefor;
   a first creating unit configured, when said device management page presence determining unit determines that one of the devices does not have the unique device management page therefor, to create a device management page for the one of the devices;
   a communication possibility determining unit configured, when said device management page presence determining unit determines that another one of the devices has the unique device management page therefor, to determine whether it is possible to communicate with the another one of the devices;
   an acquiring unit configured, when said communication possibility determining device determines that it is possible to communicate with the another one of the devices, to acquire identification information for accessing the unique device management page for the another one of the devices;
   a second creating unit configured, when said communication possibility determining device determines that it is impossible to communicate with the another one of the devices, to create a device management page for the another one of the devices; and a display control unit configured to control a display apparatus to display a device list including a list of names of the devices connected to the device managing apparatus;

wherein the device list:

correlates the one of the devices which does not have the unique device management page with the device management page created by said first creating unit, correlates, when it is determined that it is impossible for the another one of the devices to communicate with the device managing apparatus, the another one of the devices with the device management page created by said second creating unit, and correlates, when it is determined that it is possible for the another one of the devices having the unique device management page to communicate with the device managing apparatus, the another one of the devices with the unique device management page accessible with the identification information acquired by said acquiring unit.

2. A device managing apparatus according to claim 1, wherein said second creating unit creates a device management page different from the device management page created by said first creating unit.

3. A device managing apparatus according to claim 1, wherein the device management page includes information indicative of status of the device.

4. A device managing apparatus according to claim 1, wherein said communication possibility determining unit is configured to determine whether it is possible to communicate with the another one of the devices according to HTTP protocol.

5. A device managing apparatus according to claim 1, further comprising:

a retrieving unit configured to retrieve devices connected to the device managing apparatus via the network; and a device list page creating unit configured to create a device list page for displaying a list of the devices retrieved by said retrieving unit on a client apparatus.

6. A device managing apparatus according to claim 5, further comprising a reference information embedding unit configured, when any of the retrieved devices has a unique device management page thereof, to embed reference information for referring to the unique device management page of the device in the device list page.

7. A method of controlling a device managing apparatus which manages devices connected thereto via a network, comprising:

a device management page presence determining step of determining whether each of the devices has a unique device management page therefor;

a first creating step of creating a device management page for one of the devices when it is determined in said device management page presence determining step that the one of the devices does not have a unique device management page thereof;

a communication possibility determining step of determining whether it is possible to communicate with another one of the devices when it is determined in said device management page presence determining step that the another one of the devices has a unique device management page thereof;

an acquiring step of acquiring identification information for accessing the unique device management page for the another one of the devices when it is determined in said communication possibility determining step that it is possible to communicate with the another one of the devices;

a second creating step of creating a device management page for the another one of the devices when it is determined in said communication possibility determining step that it is impossible to communicate with the another one of the devices; and a display control step of controlling a display apparatus to display a device list including a list of names of the devices connected to the device managing apparatus;

wherein the device list:

correlates the one of the devices which does not have the unique device management page with the device management page created in said first creating step, correlates, when it is determined that it is impossible for the another one of the devices to communicate with the device managing apparatus, the another one of the devices with the device management page created in said second creating step, and correlates, when it is determined that it is possible for the another one of the devices having the unique device management page to communicate with the device managing apparatus, the another one of the devices with the unique device management page accessible with the identification information acquired in said acquiring step.

8. A method of controlling a device managing apparatus according to claim 7, wherein said second creating step creates a device management page different from the device management page created in said first creating step.

9. A method of controlling a device managing apparatus according to claim 7, further comprising:

a retrieving step of retrieving devices connected to the device managing apparatus via the network; and a device list page creating step of creating a device list page for displaying a list of the devices, retrieved in said retrieving step, on a client apparatus.

10. A method of creating a device managing apparatus according to claim 9, further comprising a reference information embedding step of embedding reference information for reference to the unique device management page of any of the retrieved devices in the device list page when the device has a unique device management page thereof.

11. A non-transitory computer readable medium storing a control program for causing a computer to execute a method of controlling a device managing apparatus which manages devices connected thereto via a network, the program comprising:

a device management page presence determining module for determining whether each of the devices has a unique device management page therefor;

a first creating module for creating a device management page for one of the devices when it is determined by said device management page presence determining module that the one of the devices does not have a unique device management page thereof;

a communication possibility determining module for determining whether it is possible to communicate with another one of the devices when it is determined by said device management page presence determining module that the another one of the devices has a unique device management page thereof;

an acquiring module for acquiring identification information for accessing the unique device management page for the another one of the devices when it is determined by said communication possibility determining module that it is possible to communicate with the another one of the devices;

a second creating module for creating a device management page for the another one of the devices when said communication possibility determining module determines that it is impossible to communicate with the another one of the devices; and a display control module for controlling a display apparatus to display a device list including a list of names of the devices connected to the device managing apparatus;

wherein the device list:

correlates the one of the devices which does not have the unique device management page with the device management page created by said first creating module, correlates, when it is determined that it is impossible for the another one of the devices to communicate with the device managing apparatus, the another one of the devices with the device management page created by said second creating module, and correlates, when it is determined that it is possible for the another one of the devices having the unique device management page to communicate with the device managing apparatus, the another one of the devices with the unique device management page accessible with the identification information acquired by said acquiring module.

12. A non-transitory computer readable medium according to claim 11, wherein said second creating module creates a device management page different from the device management page created by said first creating module.

13. A non-transitory computer readable medium according to claim 11, further comprising:

a retrieving module for retrieving devices connected to the device managing apparatus via the network; and a device list page creating module for creating a device list page for displaying a list of the devices, retrieved by said retrieving module, on a client apparatus.

14. A non-transitory computer readable medium according to claim 13, further comprising a reference information embedding module for embedding reference information for reference to the unique device management page of any of the retrieved devices in the device list page when the device has a unique device management page thereof.

* * * * *